United States Patent [19]
Viaud

[11] Patent Number: 5,894,790
[45] Date of Patent: Apr. 20, 1999

[54] TWINE SECURING ARRANGEMENT

[75] Inventor: Jean Viaud, Sarreguemines, France

[73] Assignee: Deere & Company, Moline, Ill.

[21] Appl. No.: 09/003,314

[22] Filed: Jan. 6, 1998

[30] Foreign Application Priority Data

Feb. 14, 1997 [DE] Germany ............... 197 05 584

[51] Int. Cl.$^6$ .................. A01F 15/07; A01D 39/00
[52] U.S. Cl. .................. 100/5; 56/341; 100/13
[58] Field of Search .................. 100/5, 13, 15, 100/87, 88, 89; 56/341, 343

[56] References Cited

U.S. PATENT DOCUMENTS

| | | | |
|---|---|---|---|
| 1,627,904 | 5/1927 | Hurff | 100/5 |
| 2,774,296 | 12/1956 | Martinmaas, Jr. | 100/5 |
| 4,205,513 | 6/1980 | Shokoples | 100/5 |
| 4,619,106 | 10/1986 | Van Der Lely | 100/89 |
| 4,793,249 | 12/1988 | Wellman . | |

FOREIGN PATENT DOCUMENTS 41 32 664  4/1993  Germany .

*Primary Examiner*—Stephen F. Gerrity

[57] ABSTRACT

A round baler is equipped with a mechanism for wrapping the bale with twine. In order to keep the end of the twine from coming loose after ejection of the bale, there is provided a pointed plunger which engages and embeds the loose twine end(s) under the surface of the bale.

10 Claims, 3 Drawing Sheets

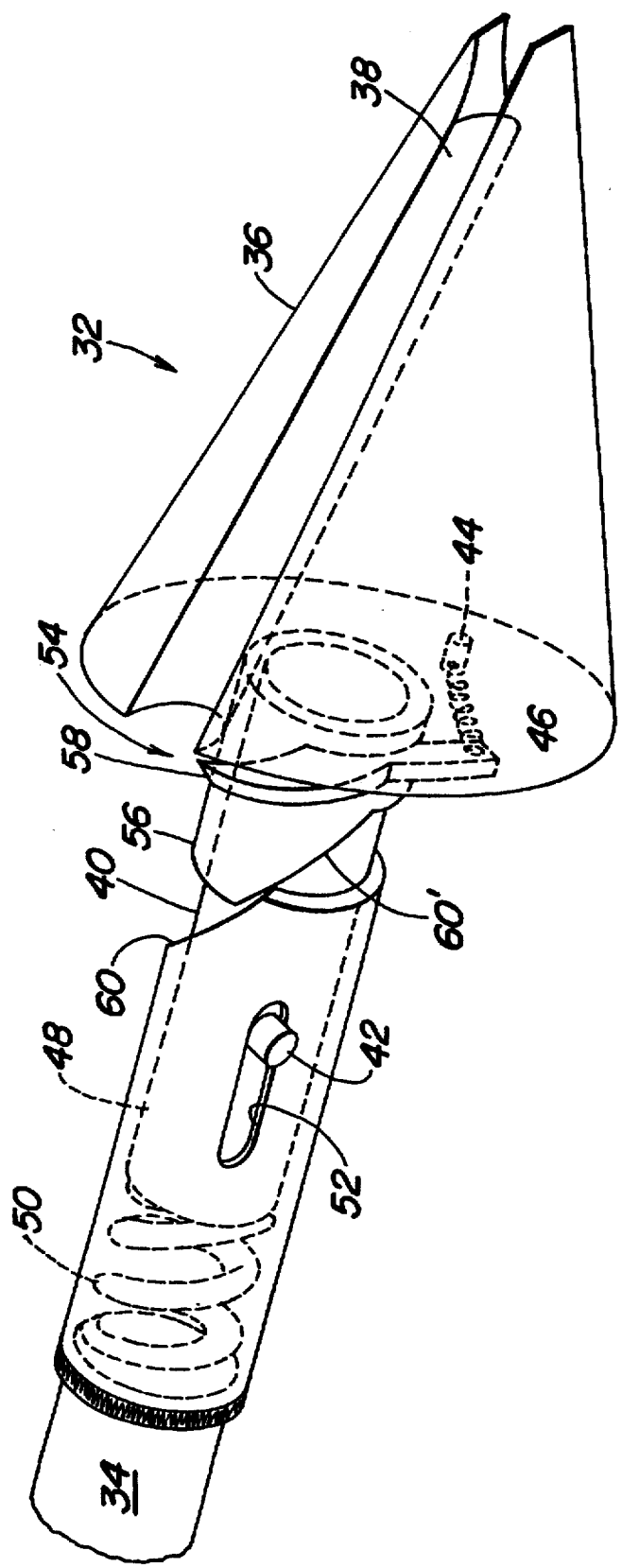

TWINE SECURING ARRANGEMENT

BACKGROUND OF THE INVENTION

The present invention relates to mechanisms for wrapping cylindrical bales of agricultural crops formed in the chambers of large round balers with twine, and, in particular, relates to mechanisms for securing loose ends of twine to the crop bales while in the bale chamber by pressing the twine into the bale.

It is conventional to wrap cylindrical bales with twine in order to prevent the baled crop from falling apart after being ejected from the baling chamber. These known wrapping devices merely wrap twine onto the circumference of the bale so that, after the twine wrapped on the bale is severed from a supply of twine, the end of the twine is not fastened and lies loosely upon the bale surface. Therefore, depending on the direction of rotation of the bale after it is ejected from the baling chamber, it is possible that the end of the twine will become unwrapped from the bale, with the consequence that the bale falls apart and/or the loose end of the twine interferes with further handling of the bale. U.S. Pat. No. 4,793,249, granted on Dec. 27, 1988 discloses a typical wrapping device of this type.

DE-A-41 32 664 reveals a round baler having a wrapping device like that just described but further includes a sprocket mounted in a slot provided in the side wall of the baling chamber and having teeth, at least one of which is grooved for engaging twine guided into its path of rotation and embedding the engaged twine into the end of the bale as the sprocket is being rotated by the rotating bale. Thus, the twine is sewn into the end face of the bale in order to prevent loose ends of the twine from falling out. This structure has the drawback that it is difficult to introduce the twine into the sprocket at the end faces of the bale.

SUMMARY OF THE INVENTION

According to the present invention, there is provided an improved structure for embedding twine end sections into a bale.

A broad object of the invention is to provide a twine embedding structure comprising a plunger having a point which has a twine engaging and retaining feature, the plunger being reciprocably driven for moving the point into the surface of a bale and depositing the twine beneath the bale surface.

A more specific object of the invention is to provide a twine embedding structure as set forth in the previous object and to further equip the plunger with a knife structure including a blade which moves between a rest position and a cutting position to sever the twine adjacent the retaining feature when the point is embedded in the bale.

Yet another object of the invention is to provide a twine embedding structure having a knife, as set forth in the immediately preceding object, wherein the blade is mounted for movement in response to relative axial movement between the point and the remainder of the plunger caused by the resistance offered by the bale to being penetrated by said point.

These and other objects will become apparent from a reading of the ensuing description together with the appended drawings.

BRIEF DESCRIPTION OF THE DRAWINGS

FIG. 3 is an enlarged perspective view of the point forming the twine engaging part of the twine securing mechanism.

DESCRIPTION OF THE PREFERRED EMBODIMENT

Figure 1:
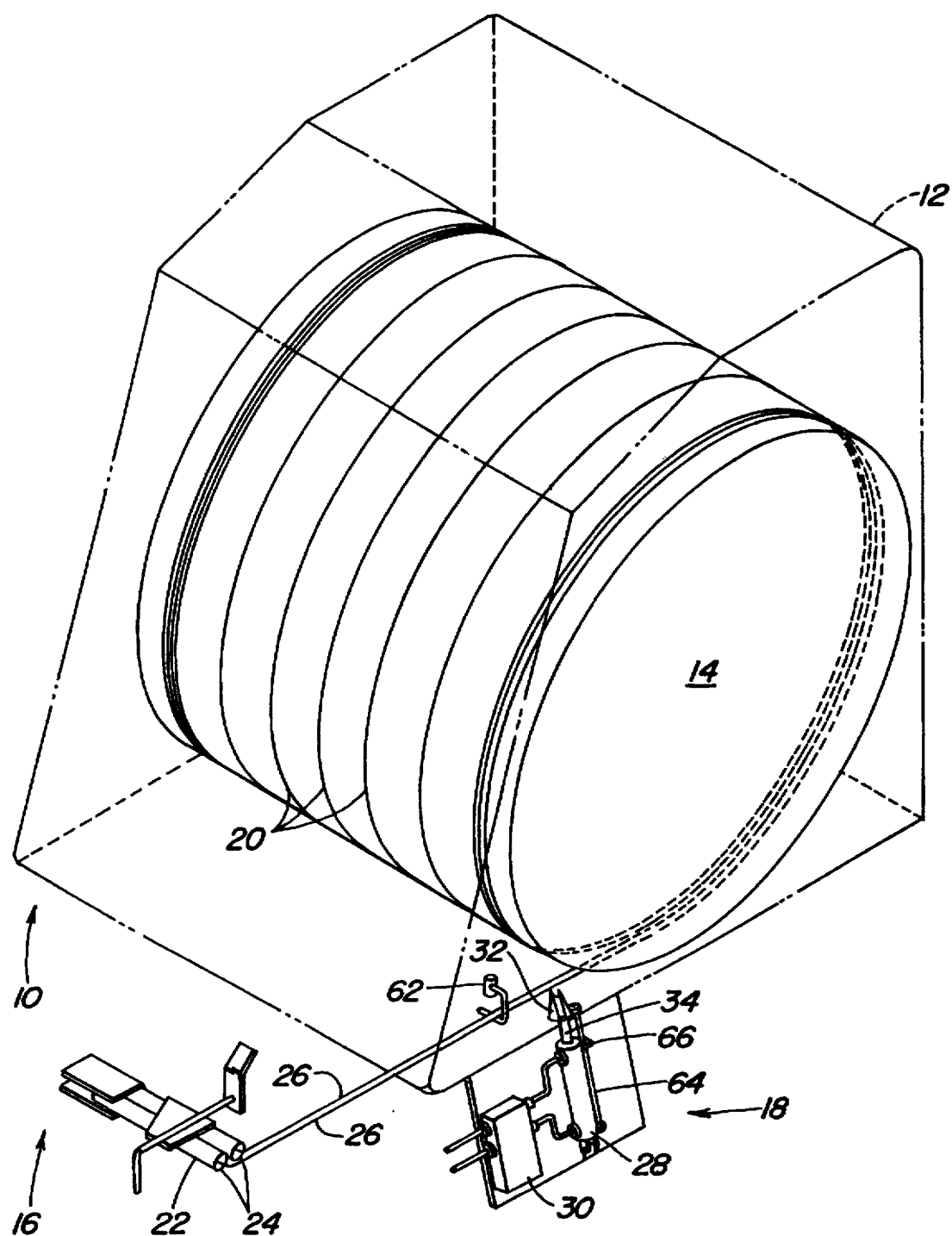
FIG. 1 is a schematic front perspective view of a round baler showing the twine securing mechanism of the present invention in a stand-by condition.
Figure 2:
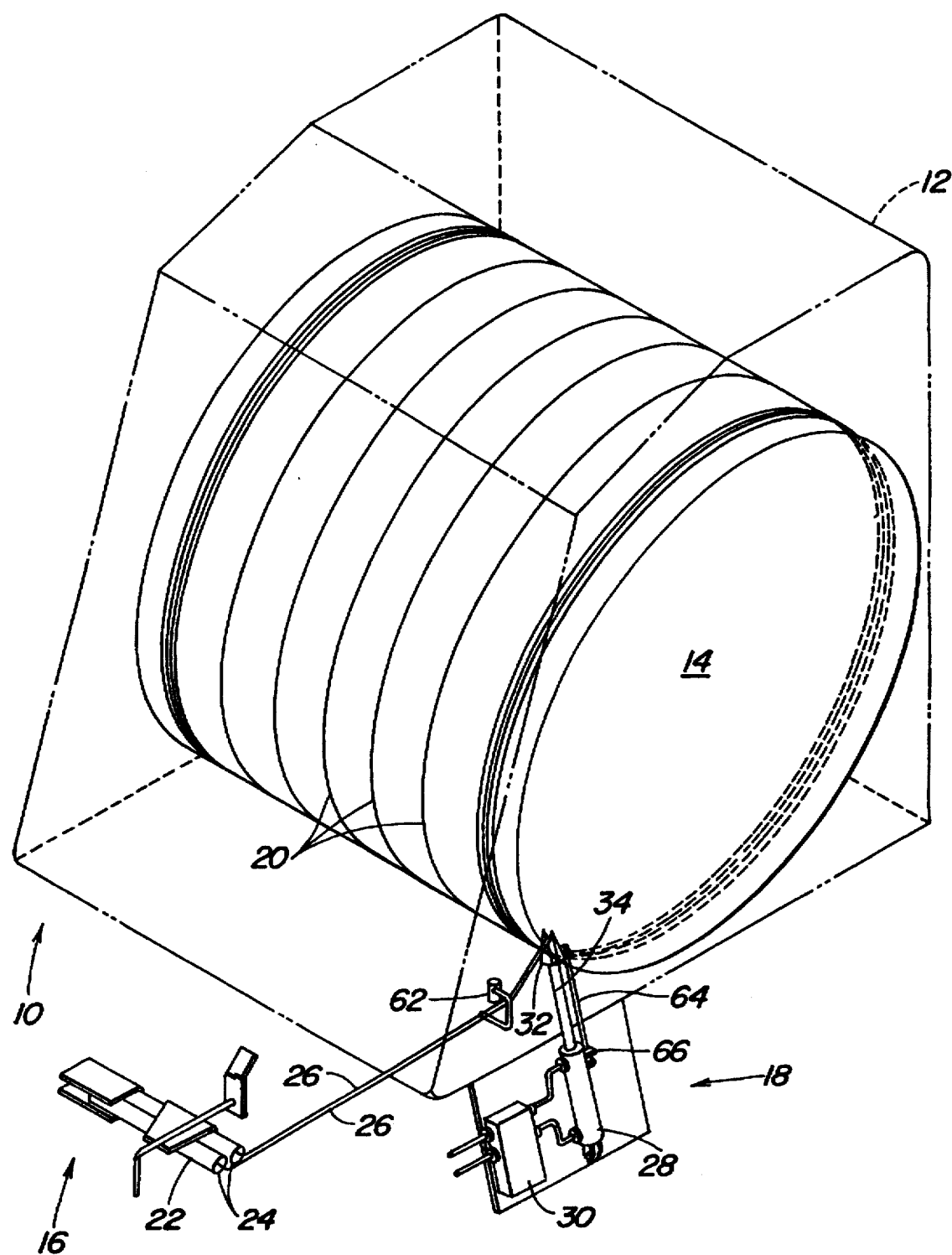
FIG. 2 is a view like FIG. 1 but showing the twine securing mechanism in an operating condition.

Referring now to FIGS. 1 and 2, there is shown a schematic outline of a round baler 10 including a frame 12 containing a bale 14. A twine delivery arrangement 16 and a twine securing mechanism 18 are also shown.

The round baler 10 may be of any conventional configuration equipped with either a fixed or an expansible baling chamber. Further, the frame 12 is also of a conventional design provided with means, not shown, that is appropriate for the attachment of the twine securing mechanism 18 and for providing access, for the mechanism, to the bale 14 inside the baling chamber.

In the usual way, crop picked up from the ground is rolled to form the bale 14 until the bale reaches a desired or maximum size, whereupon its circumference is wrapped with twine 20 to keep the bale from falling apart once ejected from the baling chamber. During the process of being wrapped with twine, the bale is kept rotating by known baling elements, not shown. Once wrapped, the bale is brought to a stop and rests for the securing of the end(s) of the twine.

The twine delivery arrangement 16 includes a twine guide 22, which, in its simplest version, is configured as a twine-dispensing arm pivoting in a horizontal plane with two twine outlet openings 24, which, in the embodiment shown, are positioned at the end of the dispensing cycle in the region of the side of the bale 14 so that respective strands 26 of the twine 20 extend, nearly on a straight line due to tension existing between each of the twine outlet openings 24 and the side region of the bale.

While the illustrated twine delivery arrangement 16 includes only one twine guide 22, obviously several guides 22 could be provided which are moved in various ways along the longitudinal axis of the bale 14 during the dispensing of twine upon the bale circumference. Furthermore, the twine-dispensing arrangement 16 could also be configured and/or operated in such a way that, instead of the strands 26 being located at the side of the bale 14 at the end of the wrapping process, they could be located in the center of the bale. Still another embodiment of the twine-dispensing arrangement 16 could result in the strands 26 being dispensed separately such that they end up at opposite sides of the bale 14.

In contrast to known twine wrapping arrangements, the arrangement 16 does not include any cutting device for cutting the twine strands 26 at a desired point of time. Instead, the function of cutting is embodied in the structure of the twine securing arrangement 18, as is described below.

Referring now to FIGS. 1-3, it can be seen that the twine securing arrangement 18 includes a motor 28, a control arrangement 30 and a plunger 32. Relative to the center of the longitudinal axis of the bale 14, the twine securing arrangement can be oriented radially toward the circumference of the bale 14 or may be slightly inclined to the radial direction. Furthermore, its direction may be selected in such a way that the plunger 32 moves at an angle to the longitudinal axis and thus is not moved deeply into the core of the bale 14 but extends at a flat angle under its surface.

In the embodiment shown, the motor 28 is configured as a double-acting hydraulic cylinder that can be extended and retracted by means of pressurized fluid. Alternatively, a pneumatic motor or an electric motor could be used. Also, the use of a spring-loaded mechanical linkage could be considered.

Control over the movement of the motor 28 is performed by the control arrangement 30, that can be performed mechanically, hydraulically or electrically. The operation of the control arrangement is performed depending on the position of the twine guide 22 and the condition of motion of the bale 14. Accordingly, the plunger 32 is actuated, as described in the following, only after the bale 14 has been brought to a halt and the twine guide has reached its end position. These conditions can either be detected by sensors, with the actuation of the control arrangement 30 being performed automatically, or by an operator who determines directly or by means of an indicator arrangement that the conditions are met and then actuates the control arrangement 30. In a special embodiment, the control arrangement 30 could include a programmable small computer.

The plunger 32 is fastened to a piston rod 34 of the motor 28, although it could be considered possible to fasten it to the cylinder. The label piston rod was chosen since this could encompass other components of motors having linear motion, for example, electric motors or pneumatic motors. Accordingly, the plunger 32 can be moved by means of the motor 28 into the bale 14 and out of it, which is preferably performed at a relatively high speed. In view of the possible density of the bale 14, it is advisable to configure the plunger 32, as well as the motor 28, as robustly as possible.

At the end region of the plunger 32 that faces the bale 14, a conical point 36 is provided that contains a twine retainer 38, which takes the form of a groove, is integrated into the conical surface. However, the twine retainer may also be configured as a finger, a bowed strap or the like. The twine retainer 38 extends in a plane that intersects the longitudinal centerline of the point 36 and, thus, intersects the tip of the conical surface. The width and the depth of the twine retainer 38 is selected in such a way that it can enclose both strands 26. The point 36 is coaxial with and has its base fixed, as by welding, for example, to one end of a shaft 40 from which a guide pin 42 extends radially. The diameter of the shaft 40 is considerably smaller than the maximum or base diameter of the cone forming the point 36. Finally, a pin 44 is fixed in the bottom of the cone and serves as an anchor for one end of a coil tension spring 46 having a purpose explained below.

The shaft 40 of the plunger 32 is supported in an axial bearing in a tube 48 so as to form a telescopic connection, where the tube 48 is fixed on the end of the piston rod 34 and is closed by it. A compression spring 50 extends between the piston rod 34 and the shaft 40 and is loaded by the insertion of the plunger 32 into a bale 14. A slot 52 is provided in the wall of, and extends parallel to the longitudinal centerline or axis of, the tube 48. The pin 42 projects through the slot 52. In this way, the point 36 with the shaft 40 is retained, guided and fixed against rotation by the pin 42, but is free to move axially in the tube 48 to the extent permitted by the slot 52. The end region of the tube 48 facing away from the piston rod 34 is defined by an inclined or curved cam surface 60.

A cutting arrangement 54, configured as a rotary knife, is located between the tube 48 and the point 36. Specifically, the cutting arrangement 54 is composed of a sleeve 56 rotatably supported, by bearings (not shown), on the end of the shaft 40, a knife 58 fixed to and extending approximately tangentially to the outer surface of the sleeve, and the spring 46. The knife 58 is configured and arranged in such a way that, upon rotation of the sleeve 56, the knife 58 traverses that end of the twine retainer 38 formed in the base of the conical point 36, and cuts the strand(s) 26 seated in and held by the retainer. For this purpose, the cutting edge of the knife 58 extends along the side facing the sleeve 56. The end of the knife 58 opposite the cutting edge retains the other end of the spring 46, so that the knife 58 is constantly being yieldably held in a stand-by position away from the twine retainer 38. At its end facing the point 36, the sleeve 56 ends in an incline or in a curved cam surface 60' that is shaped complementary to the cam surface 60 of the tube 48. In view of the concentric arrangement of the tube 48 and the sleeve 56 and due to their relative positions to each other in the axial direction, the tube 48 and the sleeve 56 are in contact with each other through the curved cam surfaces 60 and 60' and can slide upon each other when they rotate with respect to each other. Due to the force of the spring 46, the sleeve is always rotated in such a way that the curved cam surfaces are in contact with each other and due to the axial force component then resulting, the sleeve 56 always moves from the tube 48 in the axial direction and is in contact with the point 36. An L-shaped alignment rod 64 has a short leg fixed to the conical point 36 and a long leg extending through an eye or guide 66 fixed to the cylinder of the hydraulic motor 28. The rod 64 prevents the point 36, together with the piston rod 34, from turning relative to the cylinder and in this way keeps the point 36 properly oriented for engaging the tensioned twine strands 26, as they appear in FIG. 1.

Although not absolutely required, the embodiment shown contains a guide finger 62, located between the twine outlet openings 24 and the plunger 32, which grasps the strands 26 when the twine guide 22 is in its end position, or brings the strands 26 to the required position, if the twine guide 22, according to another embodiment, is not intended for this operation. The guide finger 62 guides the twine 20 or the strands 26 in such a way that the strands 26 are engaged by and securely held by the twine retainer 38, when the plunger 32 is extended.

On the basis of the above description, the operation is as follows. After the bale 14 has reached its desired or maximum size, the wrapping process is actuated either manually or automatically by means of the control arrangement 30, that is, the twine guide 22 is brought to a position near the bale 14, in which the twine 20 is grasped between the bale and the baling elements and carried along by the rotating bale 14. During the wrapping process, the twine guide 22 is moved along the longitudinal axis of the bale 14 so that twine 20 is applied helically over the entire width of the bale 14, in order to prevent the bale 14 from falling apart once it is ejected from the bale chamber. At the end of the wrapping process, which can also be determined manually or automatically, the bale 14 is stopped, that is the drive to the baling elements that rotate the bale is interrupted automatically or manually. This condition is illustrated in FIG. 1, that is, the piston rod 34 of the twine securing arrangement 18 is retracted and the strands 26 are stretched over the guide finger 62 between the twine outlet openings 24 and the side region of the bale 14. Following this, the piston rod 34 is extended in the direction of the bale 14 and the twine retainer 38 of the point 36 of the plunger 32 engages the strands 26. Further extension of the piston 34 drives the point 36 deep into the bale 14 and thereby inserts the twine 20, which is drawn off from a supply roll, not shown, through the twine guide 22, deep into the baled material, where it is retained by friction. Due to the resistance encountered by the point 36 as it is pressed into the bale 14, it moves with the shaft 40 into the tube 48, with the result that the curved cam surfaces 60, 60' slide upon each other and produce a relative rotational motion between the point 36 and the knife 58. During the rotational movement, the knife 58 traverses the twine retainer 38 and cuts the twine strands 26. This situation occurs shortly after that illustrated in FIG. 2. Finally the piston 34 is again retracted and the plunger 32 is withdrawn from the bale 14. Thereby the compression spring 50 pushes the shaft 40 of the plunger 32 again out of the tube 48 and the spring 46 returns the sleeve 56 with the knife 58 into the starting position. At the end, the plunger 32 is returned to its position shown in FIG. 1, however, now the strands 26 are cut with first ends hanging loosely from the guide finger 62, while their other ends are retained in the bale 14. The guide rod 64 operates during the pressing of the point 36 into the bale 14 to retain the point 36, and hence the twine retainer 38, properly radially oriented for engaging the twine strands 26 tensioned between guide outlets 24 and the bale 14 when it is desired to sever the twine wrapped about the bale from supply rolls (not shown) from which the respective strands 26 emanate.

I claim:

1. In a round baler including a baling chamber for rolling up cylindrical bales, a twine dispensing mechanism including a twine guide movable longitudinally along a bale and including at least one twine outlet for dispensing twine onto the circumference of a bale while the bale is being rotated within the baling chamber, and a twine securing device for pressing twine into the surface of the bale, the improvement comprising: said device including a plunger mounted for reciprocation toward and away from a surface location of the bale and including a point for insertion beneath said surface location of the bale; said point including a twine retainer for receiving and retaining at least one strand of twine, tensioned between said outlet and said bale, for movement toward and into said surface location of said bale when said plunger is driven toward said bale from a retracted position on an opposite side of said strand from said bale; a motor connected to said plunger for selectively moving the latter into and from penetrating engagement with said bale; and a twine cutting knife structure including a blade mounted to said plunger adjacent said point for movement from a rest position to a cutting position traversing a path occupied by said strand, in response to penetration of the point into the bale, for cutting said strand of twine at a location adjacent said twine retainer.

2. The round baler defined in claim 1 wherein said point defines an end of said plunger and is mounted for axial movement relative to a remaining part of said plunger; biasing means yieldably resisting axial movement of said point towards said remaining part of said plunger; said blade being mounted for reciprocating with said point and for rotating relative to said point about the axis of movement of said point; and motion transfer means acting between said blade and said plunger for causing said blade to move from said rest position to said cutting position in response to movement of said point towards said remaining part of said plunger.

3. The round baler defined in claim 2 wherein said knife structure includes a sleeve mounted for rotation about said axis of movement of said point; said blade being rigidly fixed to said sleeve; said motion transfer means including a first cam surface formed on said sleeve and a second cam surface formed on said remaining part of said plunger shaped complementary to, and engaged with, said first cam surface, with said first and second cam surfaces being shaped such that axial movement of said sleeve towards said remaining part of said plunger causes said sleeve together with said blade to move said blade from said rest position to said cutting position.

4. The round baler defined in claim 3 wherein a spring is connected between said point and said blade such that said spring resists movement of said blade to said cutting position from said rest position.

5. The round baler defined in claim 1 wherein a shaft extends along said axis of movement and is fixed to said point; said remaining portion of said plunger being provided with a tubular receptacle slidably receiving said shaft; a compression spring being located in said tubular receptacle between an end of said shaft and said remaining portion of said plunger for yieldably resisting axial movement of said point towards said remaining portion of said plunger; and means for preventing said shaft from rotating relative to said remaining portion of said plunger.

6. The round baler defined in claim 5 wherein said plunger includes a piston rod; said tubular receptacle being formed by a tube fixed to an end of and forming an extension of said piston rod; said tube having a cylindrical wall containing a slot extending parallel to said axis of movement of said plunger; and a guide pin fixed to and extending crosswise to said shaft and being received in said slot, whereby said rod, and hence said point, is prevented from rotating relative to said tube and is prevented from separating from said tube.

7. The round baler defined in claim 6 wherein said knife structure includes a sleeve mounted for pivoting about said piston rod adjacent said point; said blade being fixed to said sleeve; said sleeve having a diameter equal to a diameter of said tube; said sleeve and said tube respectively having complementary shaped cam surfaces engaged with each and shaped such that when said sleeve moves towards said tube said sleeve will be caused to rotate to move said blade from said rest position to said cutting position; and biasing means resisting movement of said blade to said cutting position.

8. The round baler defined in claim 1 and further including control means for effecting extension of said plunger toward said bale only upon said bale attaining a predetermined size, rotation of said bale being stopped and said twine guide being at a predetermined location along said bale.

9. The round baler defined in claim 1 wherein said twine retainer is configured as a groove which extends lengthwise in and over a free end of said point.

10. The round baler defined in claim 1 wherein said motor is a hydraulic motor defined in part by a cylinder and a piston rod, forming a portion of said plunger, projecting from the cylinder; a guide rod extending parallel to and being positioned alongside said cylinder and having an end fixed to said point; and a guide being fixed to said cylinder and receiving said rod for sliding therein, whereby said guide rod prevents said point from rotating relative to said piston rod.

* * * * *